US011468695B2

(12) United States Patent
Walsh et al.

(10) Patent No.: US 11,468,695 B2
(45) Date of Patent: Oct. 11, 2022

(54) SUBSTANCE DESCRIPTION MANAGEMENT BASED ON SUBSTANCE INFORMATION ANALYSIS USING MACHINE LEARNING TECHNIQUES

(71) Applicant: Accenture Global Solutions Limited, Dublin (IE)

(72) Inventors: Paul Walsh, Cork (IE); Md. Faisal Zaman, Drumcondra (IE); Nóirín Duggan, Dublin (IE); Javier Miguel Sastre-Martinez, Dublin (IE); Caitlin McDonagh, Galway (IE); Daire Corley-Carmody, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 166 days.

(21) Appl. No.: 16/913,587

(22) Filed: Jun. 26, 2020

(65) Prior Publication Data
US 2021/0406534 A1    Dec. 30, 2021

(51) Int. Cl.
*G06V 30/416* (2022.01)
*G06V 10/84* (2022.01)
(Continued)

(52) U.S. Cl.
CPC ........... *G06V 30/416* (2022.01); *G06K 9/623* (2013.01); *G06K 9/6263* (2013.01);
(Continued)

(58) Field of Classification Search
CPC .... G06V 30/416; G06V 10/751; G06K 9/623; G06K 9/6263; G06K 9/6296; G06N 3/08
See application file for complete search history.

(56) References Cited

U.S. PATENT DOCUMENTS 10,157,226 B1 * 12/2018 Costabello .......... G06F 16/9024
10,262,079 B1 * 4/2019 Costabello ............ G16H 20/30
(Continued)

OTHER PUBLICATIONS

Celebi et al. (Evaluation of Knowledge Graph Embedding Approaches for Drug-Drug Interaction Prediction using Linked Open Data), published Dec. 3, 2018, pp. 1-11. (Year: 2018).*
(Continued)

*Primary Examiner* — Stephen S Hong
*Assistant Examiner* — Ahamed I Nazar
(74) *Attorney, Agent, or Firm* — Harrity & Harrity, LLP

(57) ABSTRACT

A device may generate, from a subset of historical ontology data and a substance description of a substance, a knowledge base. The subset of historical ontology data may be associated with historical substances. The device may generate, based on the knowledge base, a substance knowledge graph embedding (KGE) that is representative of the substance; compare the substance KGE and a historical KGE associated with the knowledge base; determine, based on comparing the substance KGE and the historical KGE, a similarity score associated with the substance KGE and the historical KGE; determine, based on the similarity score, whether substance data associated with a related substance is similarly represented in the substance KGE and the historical KGE; and perform, based on whether the substance data is similarly represented in the substance KGE and the historical KGE, an action associated with the related substance relative to the substance description or the knowledge base.

20 Claims, 7 Drawing Sheets

(51) Int. Cl.
G06V 10/774 (2022.01)
G06V 10/771 (2022.01)
G06N 3/08 (2006.01)
G06K 9/62 (2022.01)
G06V 10/75 (2022.01)

(52) U.S. Cl.
CPC ............. *G06K 9/6296* (2013.01); *G06N 3/08* (2013.01); *G06V 10/751* (2022.01)

(56) References Cited

U.S. PATENT DOCUMENTS

| | | | | |
|---|---|---|---|---|
| 2006/0074980 | A1* | 4/2006 | Sarkar | G06F 16/958 |
| 2015/0324693 | A1* | 11/2015 | Hu | G16H 10/20 706/12 |
| 2019/0005019 | A1* | 1/2019 | Burke | G06F 40/284 |
| 2019/0065987 | A1* | 2/2019 | Lecue | G06N 5/04 |
| 2019/0066333 | A1* | 2/2019 | Furihata | G06V 30/40 |
| 2020/0242444 | A1* | 7/2020 | Zhang | G06N 3/006 |

OTHER PUBLICATIONS

"Enforcement." U.S. Food & Drug Administration, Jan. 31, 2018 [https://www.fda.gov/about-fda/fdas-evolving-regulatory-powers/enforcement].

Johnson, Laura, "Rethinking Pharmaceutical Labeling." Pharmaceutical Online, May 13, 2016 [https://www.pharmaceuticalonline.com/doc/rethinking-pharmaceutical-labeling-0001].

Shleifer, Caroline, "The growing need for RegTech in the Pharmaceutical Industry." Pharma IQ, Jul. 2, 2019 [https://www.pharma-iq.com/regulatorylegal/articles/the-growing-need-for-regtech-in-the-pharmaceutical-industry].

Boyce et al., "Leveraging the semantic web and natural language processing to enhance drug-mechanism knowledge in drug product labels." IHI '10: Proceedings of the 1st ACM International Health Informatics Symposium, Nov. 2010, pp. 492-496 [https://dl.acm.org/doi/10.1145/1882992.1883070].

Abstract of Duke et al., "Consistency in the safety labeling of bioequivalent medications." Pharmacoepidemiol Drug Safety, vol. 22, No. 3, Oct. 8, 2012, pp. 294-301 [https://onlinelibrary.wiley.com/doi/pdf/10.1002/pds.3351].

"Adverse Drug Reaction." ScienceDirect Topics, Advances in Pharmacology, 2013 [https://www.sciencedirect.com/topics/medicine-and-dentistry/adverse-drug-reaction].

Abstract of Marroum et al., "The Product Label: How Pharmacokinetics and Pharmacodynamics Reach the Prescriber." Clinical Pharmacokinetics, 2002, vol. 41, Issue 3, pp. 161-169, [http://www.ncbi.nlm.nih.gov/pubmed/11929317].

Abstract of Boyce et al., "Age-related Changes in Antidepressant Pharmacokinetics and Potential Drug-Drug Interactions: A Comparison of Evidence-Based Literature and Package Insert Information." American Journal Geriatric Pharmacotherapy, 2012, vol. 10, Issue 2, pp. 139-150.

Abstract of Steinmetz et al., "Assessment of Geriatric Information on the Drug Label for Commonly Prescribed Drugs in Older People." Journal of the American Geriatrics Society, 2005, vol. 53, No. 5, pp. 891-894 [http://www.ncbi.nlm.nih.gov/pubmed/15877571].

Abstract of Hines et al., "Evaluation of Warfarin Drug Interaction Listings in US Product Information for Warfarin and Interacting Drugs." Clinical Therapeutics, 2011, vol. 33, Issue 1, pp. 36-45 [http://www.ncbi.nlm.nih.gov/pubmed/21397772].

Tifticki et al., "Machine learning-based identification and rule-based normalization of adverse drug reactions in drug labels." BMC Bioinformatics, 2019, vol. 20, Article No. 707 [https://bmcbioinformatics.biomedcentral.com/articles/10.1186/s12859-019-3195-5].

Pandey et al., "Adverse Event extraction from Structured Product Labels using the Event-based Text-mining of Health Electronic Records (ETHER) system." Health Informatics Journal, 2019, vol. 25, Issue 4, pp. 1232-1243 [https://journals.sagepub.com/doi/pdf/10.1177/1460458217749883].

Tran et al., "Attention-Gated Graph Convolutions for Extracting Drug Interaction Information from Drug Labels." Nov. 4, 2019 [Retrieved Jun. 23, 2020—https://arxiv.org/pdf/1910.12419.pdf].

Boyce et al., "Dynamic enhancement of drug product labels to support drug safety, efficacy, and effectiveness." Journal of Biomedical Semantics, Jan. 26, 2013, vol. 4, Article No. 5.

Fung et al., "Extracting drug indication information from structured product labels using natural language processing." Journal of the American Medical Informatics Association, 2013, vol. 20, No. 3, pp. 482-488.

Harpaz et al., "Extracting Positive Mentions of Adverse Drug Reactions from Product Labels using a Machine Learning Centric Approach." Theory and Applications of Categories, Jan. 2017.

Li et al., "A neural joint model for entity and relation extraction from biomedical text." BMC Bioinformatics, 2017, vol. 18, Article No. 198.

Shimazawa et al., "Natural language processing-based assessment of consistency in summaries of product characteristics of generic antimicrobials." Pharmacology Research & Perspectives, 2018 [https://doi.org/10.1002/prp2.435].

Tang et al., "Two step joint model for drug drug interaction extraction." In Proceedings of the 2018 Text Analysis Conference (TAC 2018) [https://tac.nist.gov/publications/2018/participant.papers/TAC2018.HIKE_DCD_ZJU.proceedings.pdf].

Tao et al., "Extracting and Normalizing Adverse Drug Reactions from Drug Labels." In Proceedings of the 2017 Text Analysis Conference (TAC 2017) [https://tac.nist.gov/publications/2017/participant.papers/TAC2017.PRNA_SUNY.proceedings.pdf].

Celebi et al., "Evaluation of knowledge graph embedding approaches for drug-drug interaction prediction in realistic settings." BMC Bioinformatics, 2019, vol. 20, Article No. 726 [https://bmcbioinformatics.biomedcentral.com/articles/10.1186/s12859-019-3284-5].

\* cited by examiner

SUBSTANCE DESCRIPTION MANAGEMENT BASED ON SUBSTANCE INFORMATION ANALYSIS USING MACHINE LEARNING TECHNIQUES

BACKGROUND

Large quantities of drugs are being regularly produced by pharmaceutical companies. The drugs are typically provided with labels. The labels include information about the drugs (e.g., dosage, side effects, interactions with other drugs, and/or the like). Typically, the drugs are administered to patients based on the information about the drugs. Accordingly, any inaccuracy in such information may cause harm to the patients.

SUMMARY

According to some implementations, a method may include receiving, by a device, a substance description of a substance; identifying, by the device and from the substance description, related substance information associated with a pluralities of related substances that are associated with the substance; generating, by the device and based on the related substance information, a substance knowledge graph embedding (KGE) that is associated with the substance; comparing, by the device, the substance KGE and a historical KGE associated with historical ontology data, wherein the historical ontology data includes historical substance information that is associated with the pluralities of related substances; determining, by the device and based on comparing the substance KGE and the historical KGE, a similarity score associated with a related substance of the pluralities of related substances, wherein the similarity score is representative of the related substance being similarly represented within the substance KGE and the historical KGE; obtaining, by the device and based on the similarity score, validation information associated with a representation of the related substance within the substance KGE, wherein the validation information indicates a degree of confidence associated with the representation of the related substance within the substance KGE; and performing, by the device and based on the validation information, an action associated with the substance description or a knowledge base that is associated with the historical ontology data.

According to some implementations, a device may include one or more memories and one or more processors. The one or more processors may be configured to: receive a substance description that is associated with a substance; select a subset of historical ontology data that is associated with a plurality of historical substances; generate, from the subset of historical ontology data and the substance description, a knowledge base; generate, based on the knowledge base, a substance knowledge graph embedding (KGE) that is representative of the substance; compare the substance KGE and a historical KGE associated with the knowledge base; determine, based on comparing the substance KGE and the historical KGE, a similarity score associated with the substance KGE and the historical KGE; determine, based on the similarity score not satisfying a threshold, an updated prediction score representative that substance data associated with a related substance is misaligned between the substance KGE and the historical KGE; and based on the updated prediction score, select a revised subset of the historical ontology data.

According to some implementations, a non-transitory computer-readable medium may store one or more instructions. The one or more instructions, when executed by one or more processors of a device, may cause the one or more processors to: generate, from a subset of historical ontology data and a substance description of a substance, a knowledge base, wherein the subset of historical ontology data is associated with a plurality of historical substances; generate, based on the knowledge base, a substance knowledge graph embedding (KGE) that is representative of the substance; compare the substance KGE and a historical KGE associated with the knowledge base; determine, based on comparing the substance KGE and the historical KGE, a similarity score associated with the substance KGE and the historical KGE; determine, based on the similarity score, whether substance data associated with a related substance is similarly represented in the substance KGE and the historical KGE; and perform, based on whether the substance data is similarly represented in the substance KGE and the historical KGE, an action associated with the related substance relative to the substance description or the knowledge base.

DETAILED DESCRIPTION

Figure 1A:
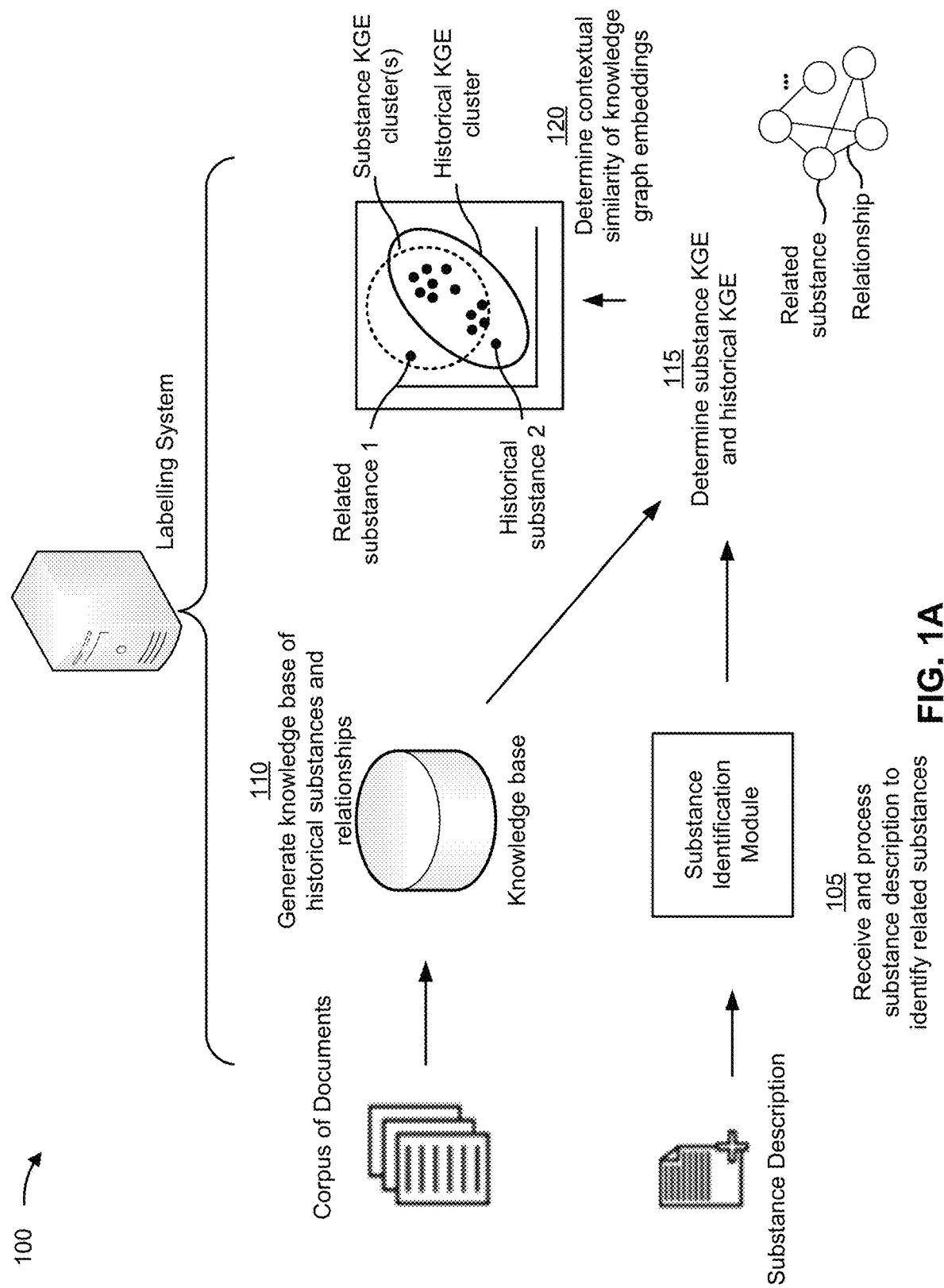
FIGS. 1A-1C are diagrams of an example implementation described herein.

The following detailed description of example implementations refers to the accompanying drawings. The same reference numbers in different drawings may identify the same or similar elements.

Large quantities of drugs are being regularly produced by pharmaceutical companies. The drugs are typically provided with drug labels. The drug labels include information about the drugs (e.g., dosage, side effects, interactions with other drugs, and/or the like). Any inaccuracy or incompleteness in such information may cause harm to patients that consume such drugs. Accordingly, pharmaceutical companies use a considerable amount of computing resources, networking resources, and/or the like to ensure that the information included on drug labels is accurate, complete, and up to date.

For example, for a particular drug, a pharmaceutical company may use computing resources, networking resources, and/or the like to search multiple sources of information (e.g., multiple data structures) to identify related drug information that is used to ensure that information, included in a label for the particular drug, remains accurate, complete, and up to date. The related drug information may include information identifying other drugs that are related to the particular drug, information regarding possible interactions of the other drugs when consumed with the particular drug, information regarding potential adverse effects of the other drugs, and/or the like.

The related drug information may be frequently updated (e.g., in the multiple data structures) to account for new related drugs that are manufactured at a rapid pace and to account for new discoveries (e.g., regarding adverse effects)

that are constantly made regarding new and existing drugs related to the particular drug. Therefore, the pharmaceutical company may use a considerable amount of computing resources, networking resources, and/or the like to frequently search the multiple data structures to ensure that the related drug information (identified by the pharmaceutical company) remains up to date.

For example, the pharmaceutical company may generate and execute numerous search queries on the multiple data structures in order to identify the related drug information. In some instances, search queries, with slight variations, may be executed multiple times by different groups within the pharmaceutical company (e.g., legal group, medical group, regulatory group, and/or the like). Additionally, the search queries may be frequently executed to ensure that the related drug information remains up to date. The frequent execution of numerous search queries, by the pharmaceutical company, on the multiple data structures unnecessarily and/or disproportionately consumes computing resources, networking resources, and/or the like.

The related drug information may include a large amount of data. Additionally, due to the rate at which the related drug information is being updated, the amount of the related drug information may increase at a rapid rate. Furthermore, the related drug information may include information in a plurality of different formats because the related drug information includes different types of information obtained from the multiple sources of information (e.g., clinical trial data, medical records, hospital records, and/or the like). Accordingly, the pharmaceutical company may use computing resources, networking resources, and/or the like to analyze the related drug information to determine the plurality of different formats and, based on determining the plurality of different formats, identify information that may be used to generate the drug label for the particular drug.

Such analysis of the related drug information is challenging, time consuming, and subject to human error especially when the related drug information includes a large amount of data and when the related drug information includes the plurality of different formats. Accordingly, such analysis of the drug information unnecessarily and/or disproportionately consumes computing resources, networking resources, and/or the like.

Some implementations described herein provide a labelling system that uses a knowledge graph embedding (KGE) of a substance (e.g., a drug) and knowledge base associated with the substance to verify that a substance description (e.g., a label) of the substance is accurate, complete, and up to date. For example, the labelling system may generate a substance knowledge graph embedding (KGE) that is representative of the substance description of the substance and generate a knowledge base from a subset of historical ontology data. The subset of historical ontology data may be selected based on information regarding related substances (e.g., substances related to the substance) that are identified in the substance description.

The labelling system may compare the substance KGE and a historical KGE (generated based on the subset of historical ontology data) and determine, based on the comparison, a similarity score associated with the substance KGE and the historical KGE. Based on the similarity score, the labelling system may determine whether the substance description and the knowledge base are to be updated to include information regarding a particular related substance.

The labelling system may use the substance KGE and the historical KGE (associated with the knowledge base) to more efficiently and more accurately identify related substances and ensure that the related substances remain up to date. Accordingly, using the labelling system conserves computing resources (e.g., processing resources, memory resources, communication resources, and/or the like), networking resources, and/or the like associated with identifying related substances that would have otherwise been used to frequently generate and execute numerous search queries in order to identify a large amount of data and to ensure that the data is up to date (as explained with respect to the prior techniques discussed above).

Additionally, the knowledge base may be generated based on the subset of historical ontology data. The subset of historical ontology data reduces the amount of data (regarding related substances) to be analyzed for the substance and, thereby, improves the efficiency of the analysis. Accordingly, using the labelling system with the substance KGE and the historical KGE (generated based on the subset of historical ontology data) conserves computing resources (e.g., processing resources, memory resources, communication resources, and/or the like), networking resources, and/or the like that would have otherwise been used to analyze a large amount of data (as explained with respect to the prior techniques discussed above).

Additionally, the labelling system may compare the substance KGE and the historical KGE to generate the similarity score that may be used to determine whether to update the substance description. The substance KGE and the historical KGE facilitates the analysis to determine whether to update the substance description. Accordingly, using the labelling system with the substance KGE and the historical KGE conserves computing resources (e.g., processing resources, memory resources, communication resources, and/or the like), networking resources, and/or the like that would have otherwise been used to analyze a large amount of data that includes different formats (as explained with respect to the prior techniques discussed above).

Figure 1B:
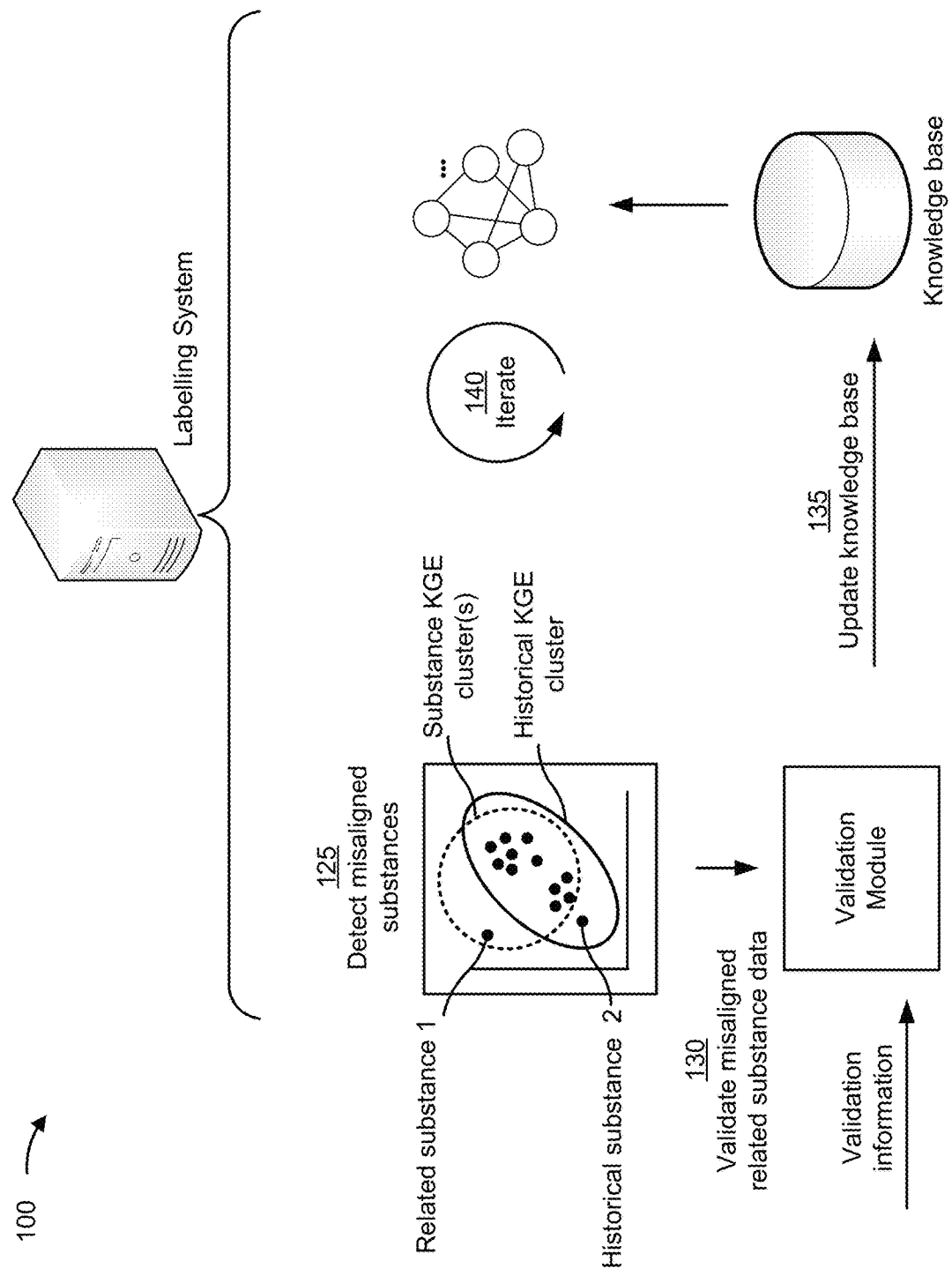
Figure 1C:
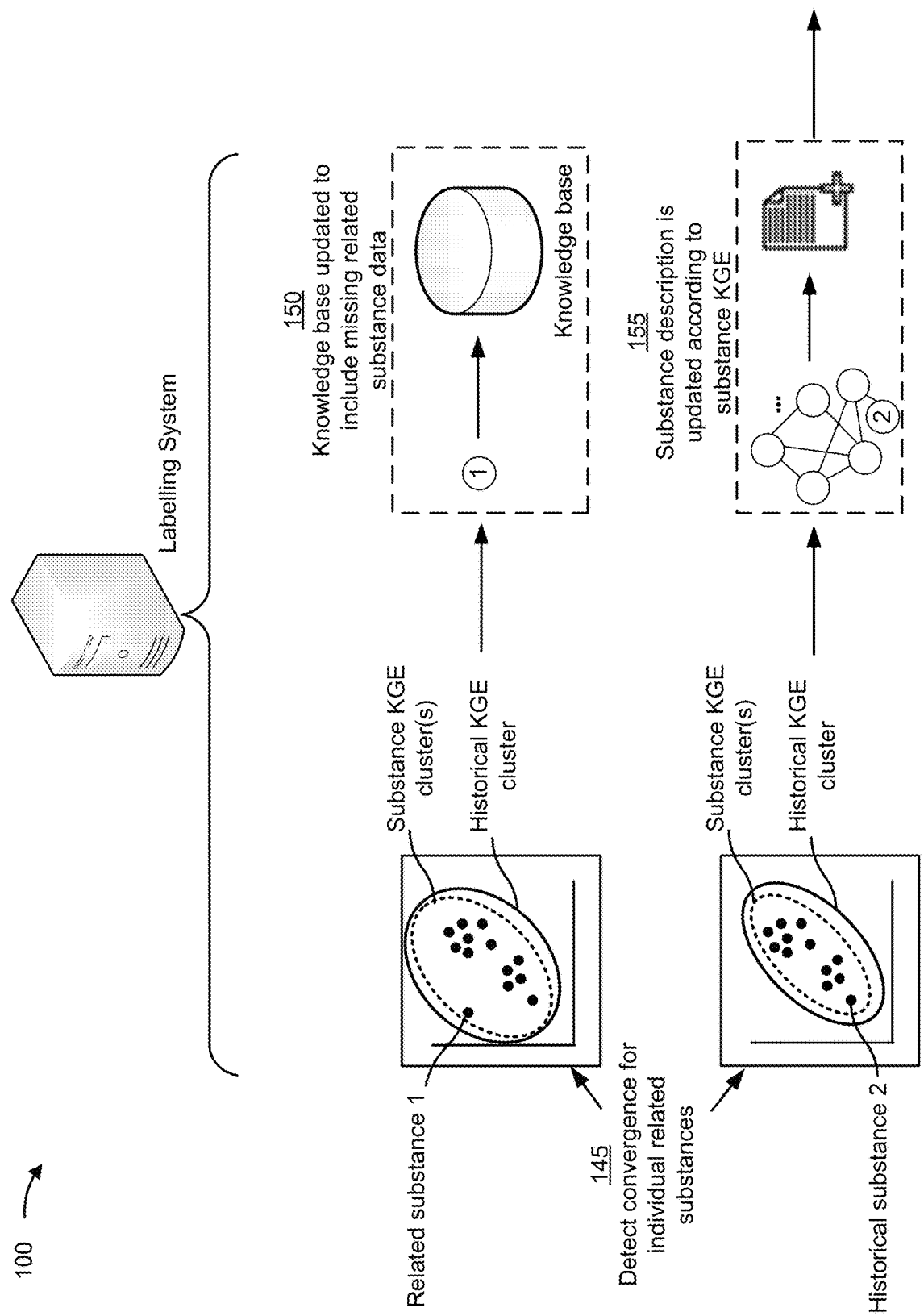

FIGS. 1A-1C are diagrams of an example implementation 100 described herein. As shown in FIGS. 1A-1C, example implementation 100 includes a labelling system, a knowledge base, a substance identification module, and a validation module. The labelling system, the knowledge base, the substance identification module, and the validation module are further described below in connection with FIGS. 1A-1C, 4 and 5.

The labelling system may be hosted by a cloud computing environment or by one or more server devices, and may be associated with one or more user devices and/or data structures (e.g., including the knowledge base discussed above). In some implementations, the labelling system may include the knowledge base, the substance identification module, and the validation module. The labelling system may use the knowledge base, the substance identification module, and the validation module to determine whether a substance description (e.g., a label) of a substance (e.g., a drug) is accurate, complete, and up to date.

The knowledge base may include a data structure (e.g., a database, a linked list, a table, and/or the like) that stores historical data (e.g., obtained from a corpus of documents) regarding different historical substances and historical data regarding relationships between the historical substances. The substance identification module may include one or more devices that identify (e.g., from the substance description) related substances (e.g., related to the substance) and/or identify relationships between the related substances. The validation module may include one or more devices that obtain validation information that is used to determine whether to update the substance description to further include information regarding one or more related substances.

As shown in FIG. 1A, and by reference number 105, the labelling system may receive and process the substance description to identify related substances. The substance may include, for example, a drug. The substance description may include, for example, a label of the drug (or a drug label), a document including information from the label of the drug, and/or the like. In this regard, the substance description may include information regarding the substance such as, for example, information identifying an active ingredient of the substance, proper uses of the substance, potential adverse effects of the substance, interaction of the substance with one or more other substances, recommended dosage of the substance (e.g., recommended dosages for different groups of individuals), situations for discontinuing use of the substance, and/or the like. In some implementations, when receiving the substance description, the labelling system may receive an electronic document and extract the substance description from the electronic document.

The information (included in the substance description) listed above is intended as examples of information that may be included in the substance description. In practice, the substance description may include a single item of information listed above, all of the information listed above, or additional information that is not listed above.

While examples described herein may use the term "substance" to refer to a drug, the term "substance" may be used to refer to anything that is intended to be ingested or injected into a living organism (e.g., human organism, animal organism, plant organism, and/or the like), such as food, a beverage, a vitamin, and/or the like. In some implementations, the labelling system may obtain the substance description from a device (e.g. a user device, a server device, and/or the like), from a data structure, and/or the like. Additionally, or alternatively, the labelling system may obtain the substance description by obtaining an image of the substance description and may use one or more optical character recognition techniques to convert image data (of the image) into textual data.

The labelling system may process the substance description to identify a layout of the substance description to facilitate the identification of text in the substance description, as described in more detail below. For example, the labelling system may identify a format of the substance description and, based on the format, may identify text in the substance description. The labelling system may use various techniques to identify the layout of the substance description such as, for example, an Extensible Markup Language to JavaScript Object Notation (xml2json) technique.

Based on identifying the layout of the substance description, the labelling system (e.g., using the substance identification module) may identify text in the substance description. For example, the text may identify related substances (e.g., substances related to the substance). In this regard, the labelling system (e.g., using the substance identification module) may identify related substances that interact with the substance. For instance, the related substances may include another drug that can be consumed with the substance, another drug that must be consumed with the substance, another drug that cannot be consumed with the substance, and/or the like. In this regard, the labelling system may identify clinical and medical concepts and/or terms from the substance description.

As an example, the labelling system may identify, in the text, references to related substances that interact with the substance. In some implementations, the text (referring to the related substances) may be associated with annotations (e.g., annotations indicating a manner in which the related substances interact with the substance, indicating whether the related substances can be consumed with the substance, indicating whether the related substances must be consumed with the substance, indicating whether the related substances cannot be consumed with the substance, and/or the like).

In some implementations, the labelling system (e.g., using the substance identification module) may use one or more natural language processing techniques to identify related substance information (associated with the related substances). The related substance information may include information regarding relationships associated with the related substances (e.g., relationships between the related substances and/or relationships between the related substances and the substance). For example, the labelling system may use one or more deep learning-based natural language processing techniques to identify the related substance information. For instance, the labelling system may use a neural network to identify the relationships associated with the related substances.

As an example, the labelling system may use a long short-term memory (LSTM) machine learning model (e.g., a bi-directional LSTM) to identify the relationships associated with the related substances. For example, the labelling system may determine interaction data and relationship data from the substance description using a neural network model (e.g., a bi-directional LSTM), display the interaction data and the relationship data to a user, receive feedback data from the user, and modify the neural network model based on the feedback data. The natural language processing techniques may be configured and trained to adapt to nuances and requirement of a company that manufactures the substance. In some implementations, the labelling system may use one or more natural language processing techniques to identify, in the substance description, one or more rules (e.g., one or more business rules) associated with the related substances. In this regard, the labelling system may identify the relationships associated with the related substances based on the one or more rules.

The relationships may indicate that a first related substance interacts with the substance to cause a first effect, that a second related substance interacts with the substance to cause a second effect, that a third related substance interacts with the substance to cause a third effect, that the first related substance interacts with the second related substance to cause a third effect based on the substance, that the second related substance interacts with the third related substance to cause a fourth effect based on the substance, and/or the like.

In some implementations, the labelling system may express the relationships in the form of subject-predicate-object (or a triple). For example, the subject may identify a related substance, the predicate may identify the interaction, and the object may identify the effect caused by the interaction. For instance, based on the relationships above, the subject may be "first related substance," the predicate may be "interacts with the substance," and the object may be "cause a first effect." In some implementations, the object may further include information regarding an individual such as, for example, information identifying a type of individual (e.g., infant, child, adult, male, female, and/or the like), information regarding the type of individual (e.g., age, weight, height, body mass index, existing medical conditions(s), and/or the like), and/or the like.

The relationships (associated with the related substances) and the format of the relationships listed above are intended as examples of relationships and the format of the relationships that may be identified by the labelling system. In practice, the labelling system may use one or more of the relationships and the format of the relationships listed above and/or one or more other relationships and other formats of the relationships that are not listed above.

As shown in FIG. 1A, and by reference number 110, the labelling system may generate a knowledge base of historical substances and relationships between the historical substances. For example, the labelling system may obtain a corpus of documents and generate the knowledge base using the corpus of documents. The corpus of documents may include documents that include information regarding a plurality of substances. For example, the corpus of documents may include historical ontology data (e.g., historical clinical ontology data) relating to the plurality of substances. For instance, the corpus of documents may include company core data sheets and/or summary of product characteristics of a plurality of companies (e.g., pharmaceutical companies). The historical ontology data may include historical substance information regarding the historical substances. The historical substance information may include historical information regarding relationships between the historical substances.

Based on the corpus of documents, the labelling system may generate the knowledge base to include information identifying the historical substances and the relationships between the historical substances. For example, the labelling system may analyze the historical ontology data to identify the historical substances and to determine the relationships between the historical substances. In some implementations, the labelling system may determine the relationships between the historical substances and may express the relationships in the form of subject-predicate-object (or a triple), in a manner similar to the manner described above with respect to FIG. 1A (reference number 105).

In some implementations, the labelling system may identify, based on the related substances, a proper subset of the historical ontology data that is associated with the related substances and may generate the knowledge base using the subset of the historical ontology data. For example, the labelling system may determine an initial measure of similarity (e.g., an initial similarity score) associated with the related substances and the historical substances. For instance, the labelling system may determine an initial measure of similarity (e.g., contextual similarity) between the related substances and the historical substances, between the relationships associated with the related substances and the relationships between the historical substances, between the historical substances and the substance, and/or the like.

In this regard, the initial measure of similarity may comprise a measure of coherence similarity (e.g., coherence similarity score) that is generated based on a cosine similarity analysis. For example, as part of the cosine similarity analysis, the labelling system may determine a cosine similarity score for the related substances, the historical substances, the relationships associated with the related substances, the relationships between the historical substances, and/or the like. Based on the cosine similarity score, the labelling system may determine the measure of coherence similarity score (or coherence metric) for the related substances, the historical substances, the relationships associated with the related substances, the relationships between the historical substances, and/or the like.

Based on the initial measure of similarity, the labelling system may identify one or more historical substances (and the relationships between the one or more historical substances) that are similar to the related substances (and the relationships associated with the related substances). Accordingly, the labelling system may select the subset of historical ontology data based on the initial similarity score. The subset of the historical ontology data may include the one or more historical substances and the relationships between the one or more historical substances.

Alternatively, the labelling system may select a subset of the historical ontology data that is associated with a plurality of historical substances. The subset of historical ontology data may be selected based on an initial prediction score (e.g., associated with the related substances and the historical substances). In some implementations, the labelling system may generate the knowledge base from the subset of historical ontology data and the substance description.

Using the subset of the historical ontology data that is associated with the related substances to generate the knowledge base reduces the amount of time that would have been used to perform an analysis, using an entirety of the historical ontology data, to identify substances that are related to the substance, thereby preserving computing resources (e.g., processing resources, memory resources, communication resources, and/or the like), networking resources, and/or the like that would have otherwise been used to analyze a large amount of data to identify substances that are related to the substance using a less efficient technique.

As shown in FIG. 1A, and by reference number 115, the labelling system may determine (or generate) a substance knowledge graph embedding (KGE) associated with the substance and a historical KGE associated with the knowledge base. For example, the labelling system may generate the substance KGE (or a KGE for the substance) based on the related substance information (e.g., based on the related substances and the relationships associated with the related substances). For instance, the substance KGE may include information identifying the related substances and the relationships (e.g., the triples). As an example, nodes of the substance KGE may represent the substance, the related substances, and/or the effects of the interactions. The connections between the nodes may represent the relationships (e.g., the triples). For example, the relationships may correspond to embeddings of the substance KGE. In some instances, attributes of a connection (e.g., a weight, a length, and/or the like) of two nodes may represent a measure of closeness of the relationship between the two nodes. For instance, the greater the weight of the connection, the closer the relationship between the two nodes, and vice versa. Similarly, the shorter the distance of the connection, the closer the relationship between the two nodes, and vice versa.

In some implementations, the substance KGE may be implemented as an artificial intelligence model and the labelling system may train the artificial intelligence model with historical data (e.g., historical data identifying substance descriptions, substances identified in the substance descriptions, relationships between such substances, historical ontology data, and/or the like) to verify accuracy and completeness of the substance description. The labelling system may train the artificial intelligence model in a manner similar to the manner described below in connection with FIG. 2. Alternatively, rather than training the artificial intelligence model, the labelling system may obtain the artificial intelligence model from another system or device that trained the artificial intelligence model. In this case, the other system or device may obtain the historical data (e.g., the historical data discussed above) for use in training the artificial intelligence model, and may periodically receive additional data that the other system or device may use to retrain or update the artificial intelligence model.

Generating the substance KGE that includes information identifying the related substances and the relationships (e.g., the triples) reduces the amount of time that would have been used to perform an analysis to identify substances that are related to the substance, thereby preserving computing resources (e.g., processing resources, memory resources, communication resources, and/or the like), networking resources, and/or the like that would have otherwise been used to analyze a large amount of data in a less efficient manner.

The labelling system may generate the historical KGE based on the historical substances and the relationship between the historical substances (identified in the historical ontology data), in a manner similar to the manner described above with respect to generating the substance KGE. In some implementations, the labelling system may generate the historical KGE based on a proper subset of the historical substances of the historical ontology data (corresponding to the subset of the historical ontology data) and the relationship between the subset of the historical substances (identified in the subset of the historical ontology data).

As shown in FIG. 1A, and by reference number 120, the labelling system may determine contextual similarity of knowledge graph embeddings. The labelling system may compare the substance KGE and the historical KGE to determine the contextual similarity of knowledge graph embeddings of the substance KGE and the historical KGE (e.g., the contextual similarity between the relationships associated with the related substances and the relationships between the historical substances). For example, the labelling system may compare the embeddings of the substance KGE (e.g., the relationships associated with the related substances) and the embeddings of the historical KGE (e.g., the relationships between the historical substances). The labelling system may determine, based on the comparison, a measure of similarity (e.g., a similarity score) associated with one or more of the related substances.

In some implementations, the similarity score of a related substance may be representative of whether the related substance is similarly represented within the substance KGE and the historical KGE. For example, the similarity score may determine whether one or more of the relationships (in the substance KGE) including the related substance are similar to one or more of the relationships (in the historical KGE) including the related substance. In some implementations, the labelling system may determine, based on the comparison, a similarity score associated with one or more of the historical substances in a manner similar to the manner described above.

Comparing the substance KGE and the historical KGE to determine the contextual similarity reduces the amount of time that would have been used to perform a search and an analysis to identify substances that are related to the substance, thereby preserving computing resources (e.g., processing resources, memory resources, communication resources, and/or the like), networking resources, and/or the like that would have otherwise been used to perform searches and analysis in accordance with the prior techniques.

In some implementations, when comparing the substance KGE and the historical KGE, the labelling system may generate, based on the substance KGE, a substance coherency cluster associated with the substance KGE (or a substance KGE cluster) and generate, based the historical KGE, a historical coherency cluster associated with the historical KGE (a historical KGE cluster). The labelling system may determine the similarity score based on an alignment analysis of the substance KGE cluster and the historical KGE cluster. In this regard, the similarity score may comprise a coherence similarity score that is generated based on a cosine similarity analysis.

For example, as part of the cosine similarity analysis for a particular substance (e.g., a related substance or a historical substance), the labelling system may determine a coherence metric of the particular substance that is based on a cosine similarity score of the particular substance. The cosine similarity score of the particular substance may include a measure of closeness of relationship with respect to one or more other substances in a coherence cluster (e.g., the substance KGE cluster or the historical KGE cluster). In this regard, based on the cosine similarity score of the particular substance, a representation of the particular substance may be included in the coherence cluster. For example, if the cosine similarity score satisfies a threshold associated with the coherence cluster, the representation of the particular substance may be included in the coherence cluster. A value of the cosine similarity score may indicate a distance between the representation of the particular substance and the representation of the one or more related substances. The distance may be based on the measure of closeness of relationship (e.g., as the value of the cosine similarity score increases, the distance decreases and, accordingly, the measure of closeness of relationship increases, and vice versa).

The labelling system may perform an alignment analysis of the substance KGE cluster and the historical KGE cluster and, based on the alignment analysis, may detect substances that are aligned and substances that are misaligned, as explained in more detail below. For example, the substances that are aligned may be included in the substance KGE cluster and in the historical KGE cluster while the substances that are misaligned may be included in only one of the substance KGE cluster or the historical KGE cluster. The scores described herein are merely provided as examples. Other examples may differ from the similarity scores described herein. For example, the labelling system may determine a measure of similarity that is different than a score.

Performing an alignment analysis of the substance KGE cluster and the historical KGE cluster reduces the amount of time that would have been used to perform a search and an analysis to identify substances that are related to the substance, thereby preserving computing resources (e.g., processing resources, memory resources, communication resources, and/or the like), networking resources, and/or the like that would have otherwise been used to perform searches and analysis in accordance with the prior techniques.

As shown in FIG. 1B, and by reference number 125, the labelling system may detect misaligned substances. For example, based on the alignment analysis, the labelling system may determine that Related substance 1 (one of the related substances identified in the substance description) and Historical substance 2 (one of the historical substances identified in the subset of historical ontology data) are misaligned. For example, the labelling system may detect that substance data of Related substance 1 is outside of the historical KGE cluster and inside of the substance KGE cluster and may detect that substance data of Historical substance 2 is outside of the substance KGE cluster and inside of the historical KGE cluster. In this regard, the labelling system may determine that the similarity score of Related substance 1 does not satisfy a historical KGE threshold associated with the historical KGE and the similarity score of Historical substance 2 does not satisfy a substance KGE threshold associated with the substance KGE. The substance data of Related substance 1 may include one or more relationships (or one or more triples) including Related substance 1. The substance data of Historical substance 2 may include one or more relationships (or one or more triples) including Historical substance 2.

In this regard, for example, Related substance 1 may be included in the substance KGE cluster (based on the cosine similarity score of Related substance 1 satisfying a threshold cosine score for the substance KGE) but excluded from the historical KGE cluster (based on the cosine similarity score of Related substance 1 not satisfying a threshold cosine score for the historical KGE). Historical substance 2 is included in the historical KGE cluster (based on the cosine similarity score of Historical substance 2 satisfying the threshold cosine score for the historical KGE) but excluded from the substance KGE cluster (based on the cosine similarity score of Historical substance 2 not satisfying the threshold cosine score for the substance KGE).

For example, the misalignment of Related substance 1 may indicate that a first substance, identified in the substance description, is not included in the historical ontology data identifying substances that are related to the substance. Additionally, the misalignment of Historical substance 2 may indicate that a second substance, included in the historical ontology data, is not included in the substance description.

In some implementations, based on determining that the similarity score of Related substance 1 does not satisfy a historical KGE threshold associated with the historical KGE and the similarity score of Historical substance 2 does not satisfy a substance KGE threshold associated with the substance KGE, the labelling system may determine an updated prediction score representative that Related substance 1 is misaligned between the substance KGE and the historical KGE. Based on the updated prediction score, the labelling system may select a revised subset of the historical ontology data.

As shown in FIG. 1B, and by reference number 130, the labelling system may validate misaligned substance data (e.g., based on determining that the similarity score of Related substance 1 does not satisfy the historical KGE threshold and that the similarity score of Historical substance 2 does not satisfy the substance KGE threshold). For example, based on detecting that the substance data of Related substance 1 is outside of the historical KGE cluster, the labelling system may determine that a relationship including Related substance 1 has not been included in the knowledge base. Additionally, based on detecting that the substance data of Historical substance 2 is outside of the substance KGE cluster, the labelling system may determine that a relationship including Historical substance 2 has not been included in the substance KGE cluster.

In some implementations, the labelling system (e.g., using the validation module) may determine whether the misaligned substance data (e.g., the substance data of Related substance 1 and the substance data of Historical substance 2) is to be validated (e.g., determine whether to include the misaligned substance data in the substance KGE and/or the knowledge base). For example, the labelling system may determine whether the similarity score of Related substance 1 and the similarity score of Historical substance 2 satisfy a validation threshold. The validation threshold may ensure that misaligned substances with highest similarity scores (out of similarity scores of all misaligned substances that are identified in connection with the alignment analysis) are submitted for validation.

Additionally, or alternatively, the labelling system may rank the misaligned substances based on their similarity scores (and/or based on business rules associated with the substance description) and select a threshold number of misaligned substances to be submitted for validation. In this regard, the related substances that are not submitted for validation may be considered outliers and may be, accordingly, removed from consideration. Assume, for this example, that the labelling system determines that the similarity score of Related substance 1 and the similarity score of Historical substance 2 meet the validation threshold and/or determines that Related substance 1 and Historical substance 2 are included in the threshold number of misaligned substances to be submitted for validation. Accordingly, the labelling system (e.g., using the validation module) may determine that the misaligned substance data (e.g., the substance data of Related substance 1 and the substance data of Historical substance 2) is to be validated.

In this regard, the labelling system (e.g., using the validation module) may provide the misaligned substance data to a device associated with a user for validation by the user. For example, the labelling system may transmit a request, to the device, to validate the misaligned substance data and provide the misaligned substance data to the device via a user interface. In this regard, the labelling system may provide the misaligned substance data as recommendations for updating the knowledge base and/or updating the substance KGE (and, consequently, the substance description) to include the misaligned substance data. In some implementations, the labelling system may provide, as reasoning for the recommendation, the scores generated for the misaligned substances and corresponding thresholds, the ranking of the misaligned substances, historical misaligned substance data, historical user feedback regarding the historical misaligned substance data, and/or the like.

The user may provide validation information, via the user interface and using the device, to the labelling system and the labelling system may receive the validation information as a user input to the request. The validation information may indicate a measure of confidence associated with the substance data of Related substance 1 and a measure of confidence associated with the substance data of Historical substance 2. Based on whether the measure of confidence associated with the substance data of Related substance 1 satisfies a threshold measure of confidence, the labelling system may determine whether to update the knowledge base to include the substance data of Related substance 1. Based on whether the measure of confidence associated with the substance data of Historical substance 2 satisfies the threshold measure of confidence, the labelling system may determine whether to update the substance KGE to include the substance data of Historical substance 2.

Providing the recommendation with a reasoning and obtaining the validation information reduces the amount of time that would have been used to perform an analysis to identify substances that are related to the substance and expedites user feedback regarding the misaligned substances, thereby preserving computing resources (e.g., processing resources, memory resources, communication resources, and/or the like), networking resources, and/or the like that would have otherwise been used to perform such analysis in accordance with the prior techniques.

Additionally, or alternatively, the labelling system (e.g., using the validation module) may validate the misaligned substance data using one or more artificial intelligence models that are trained to validate misaligned substance data (e.g., with or without user input). The one or more artificial intelligence models may be trained to validate the misaligned substance data using historical validation data. The historical validation data may include historical misaligned substance data, historical knowledge base data, historical substance KGEs, historical data indicating whether the historical misaligned substance data was added to the historical knowledge base and/or the historical substance KGEs, historical data identifying a portion of the historical misaligned substance data that was added to the historical knowledge base, historical data identifying a portion of the historical misaligned substance data that was added to the historical substance KGEs, historical data identifying a portion of the historical misaligned substance data that was withdrawn from consideration, a measure of confidence associated with the historical misaligned substance data, historical user feedback regarding the historical misaligned substance data, and/or the like.

The labelling system may obtain the validation information, from the one or more artificial intelligence models, as a result of the one or more artificial intelligence models evaluating the misaligned substance data to validate the misaligned substance data. The validation information may indicate a measure of confidence associated with the substance data of Related substance 1 and a measure of confidence associated with the substance data of Historical substance 2.

As shown in FIG. 1B, and by reference number 135, the labelling system may update the knowledge base. For example, the labelling system may determine whether the measure of confidence associated with the substance data of Related substance 1 satisfies the threshold measure of confidence. If the labelling system determines that the measure of confidence associated with the substance data of Related substance 1 satisfies the threshold measure of confidence, the labelling system may determine to include the substance data associated with Related substance 1 in the knowledge base. For example, Related substance 1 may correspond to a substance that is related to, but not one of, the historical substances identified in the subset of historical ontology data. The labelling system may update the knowledge base data structure to include the substance data associated with Related substance 1.

Alternatively, if the labelling system determines that the measure of confidence associated with the substance data of Related substance 1 does not satisfy the threshold measure of confidence, the labelling system may determine to not include the substance data associated with Related substance 1 in the knowledge base.

As shown in FIG. 1B, and by reference number 140, the labelling system may iterate the operations of reference numbers 115 to 135 (e.g., to retrain the substance KGE). For example, based on detecting the misaligned substances, the labelling system may determine that a convergence condition is not satisfied with respect to the substance KGE and the historical KGE. The convergence condition may be satisfied when the substance data of the related substances is similarly represented in the substance KGE and the historical KGE. In this instance, based on the similarity score reflecting that substance data of the related substances is not similarly represented in the substance KGE and the historical KGE, the labelling system may determine that there are misaligned substances. Accordingly, the labelling system may determine that the convergence condition is not satisfied.

The labelling system may determine whether the measure of confidence associated with the substance data of Historical substance 2 satisfies the threshold measure of confidence. If the labelling system determines that the measure of confidence associated with the substance data of Related substance 1 does not satisfy the threshold measure of confidence, the labelling system may determine to not include the substance data associated with Related substance 1 in the knowledge base.

Alternatively, if the labelling system determines that the measure of confidence associated with the substance data of Historical substance 2 satisfies the threshold measure of confidence, the labelling system may determine to include the substance data associated with Historical substance 2 in the substance KGE and, therefore, to include the substance data associated with Historical substance 2 in the substance description. For example, Historical substance 2 may correspond to a substance that can affect the consumption of the substance.

Accordingly, the labelling system may update the substance KGE to include the substance data associated with Historical substance 2 (e.g., thereby generating a new substance KGE, in a manner similar to the manner described in connection with FIG. 1A (reference number 115)). The labelling system may generate a new historical KGE based on the new substance KGE (that is generated based on the related substances (which now include Historical substance 2)), in a manner similar to the manner described in connection with FIG. 1A (reference number 120). For example, the labelling system may identify a new subset of the historical ontology data based on the related substances (which now include Historical substance 2) and generate the new historical KGE based on the new subset of the historical ontology data. The labelling system may compare the new substance KGE and the new historical KGE to determine a new similarity score, in a manner similar to the manner described in connection with FIG. 1A (reference number 120).

For example, the labelling system may generate, based on the new substance KGE, a new substance KGE cluster and generate, based the new historical KGE, a new historical KGE cluster, in a manner similar to the manner described in connection with FIG. 1A (reference number 120). The labelling system may determine the new similarity score based on an alignment analysis of the new substance KGE cluster and the new historical KGE cluster, in a manner similar to the manner described in connection with FIG. 1A (reference number 120).

As shown in FIG. 1C, and by reference number 145, the labelling system may detect convergence for individual related substances. For example, assume that, based on the validation information, the knowledge base is updated to include the substance data of Related substance 1 and that the substance KGE is updated to include the substance data of Historical substance 2, as described above. Further assume that the labelling system has performed the alignment analysis of the new substance KGE cluster and the new historical KGE cluster and has determined a new similarity score based on the alignment analysis of the new substance KGE cluster and the new historical KGE cluster.

Based on the alignment analysis, the labelling system may determine that related substances included in the new substance KGE cluster are also included in the new historical KGE cluster, as shown in FIG. 1C. In this regard, the new similarity score may reflect that there are no misaligned substances. Based on the new similarity score reflecting that there are no misaligned substances, the labelling system may determine that the convergence condition has been satisfied. For example, the labelling system may determine that substance data of the related substances is similarly represented in the substance KGE and the historical KGE.

As shown in FIG. 1C, and by reference number 150, the labelling system may update the knowledge base to include missing substance data. For example, based on determining that the convergence condition has been satisfied, the labelling system may update the knowledge base to include the substance data of the related substances (included in the new substance KGE) that are not included in the knowledge base. By updating the knowledge base, the labelling system may ensure that the knowledge base includes data to be used to verify that substance descriptions of substances are accurate, complete, and up to date.

As shown in FIG. 1C, and by reference number 155, the labelling system may update the substance description according to the substance KGE. For example, based on determining that the convergence condition has been satisfied, the labelling system may update the substance description to include the substance data of the related substances included the new substance KGE. For example, the labelling system may update the substance description to include information regarding the drug corresponding to Related substance 1. In some implementations, the labelling system may generate (and/or cause to be generated) a new substance description based on updating the substance description. By generating (and/or causing to be generated) the new substance description, the labelling system may ensure that a substance description that is accurate, complete, and up to date is being used for the substance.

The labelling system and the substance KGE described herein are highly configurable and are trained to adapt to particular nuances of different substances and/or of different pharmaceutical companies. The labelling system may enable the rapid deployment and customization of artificial intelligence-based processing pipelines to assist humans and/or artificial intelligence models in the validation of substance descriptions. The labelling system can be highly tuned to the specific labelling needs associated with one or more substances and/or associated with one or more pharmaceutical companies.

As indicated above, FIGS. 1A-1C are provided as an example. Other examples may differ from what is described with respect to FIGS. 1A-1C. The number and arrangement of devices shown in FIGS. 1A-1C are provided as an example. In practice, there may be additional devices, fewer devices, different devices, or differently arranged than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
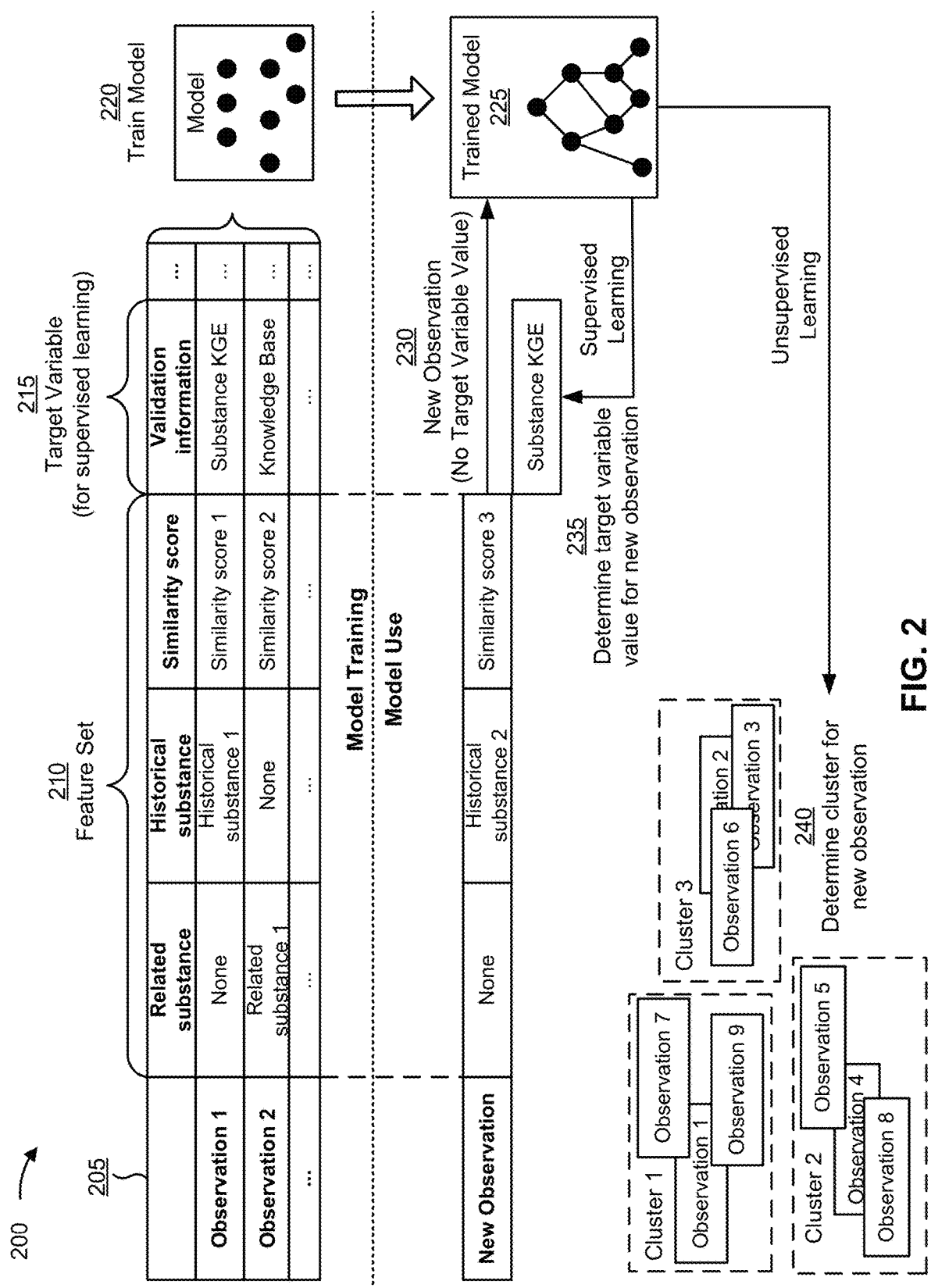
FIG. 2 is a diagram illustrating an example of training and using a machine learning model in connection with substance description management.

FIG. 2 is a diagram illustrating an example 200 of training and using a machine learning model in connection with substance description management. The machine learning model training and usage described herein may be performed using a machine learning system. The machine learning system may include or may be included in a computing device, a server, a cloud computing environment, and/or the like, such as the labelling system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the labelling system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the labelling system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of Related substance (e.g., substance data of a related substance), a second feature of Historical substance (e.g., substance data of a historical substance), a third feature of Similarity score, and so on. As shown, for a first observation, the first feature may have a value of None, the second feature may have a value of Historical substance 1, the third feature may have a value of Similarity score 1, and so on. These features and feature values are provided as examples, and may differ in other examples. For example, the feature set may include one or more of the following features: Substance, Substance description, Substance KGE cluster, Historical KGE cluster, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is Validation information, which has a value of Substance KGE for the first observation (e.g., substance data of Historical substance 1 should be included in Substance KGE).

The feature set and target variable described above are provided as examples, and other examples may differ from what is described above. For example, for a target variable of Substance description, the feature set may include Substance, Related substances, Historical substances, and Misaligned historical substance.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of None, a second feature of Historical substance 2, a third feature of Similarity score 3, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of Substance KGE for the target variable of Validation information for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, update Substance KGE to include substance data of Historical substance 1. The first automated action may include, for example, including substance data of Historical substance 2 in Substance KGE.

As another example, if the machine learning system were to predict a value of None for the target variable of Validation information, then the machine learning system may provide a second (e.g., different) recommendation (e.g., do not include Historical substance 2 in Substance KGE) and/or may perform or cause performance of a second (e.g., different) automated action (e.g., refrain from including substance data of Historical substance 2 in Substance KGE).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., Substance KGE cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., Historical KGE cluster), then the machine learning system may provide a second (e.g., different) recommendation (e.g., do not include substance data of Historical substance 2 in Substance KGE cluster) and/or may perform or cause performance of a second (e.g., different) automated action, such as refrain from including substance data of Historical substance 2 in Substance KGE cluster.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

The recommendations, actions, and clusters described above are provided as examples, and other examples may differ from what is described above.

In this way, the machine learning system may apply a rigorous and automated process to manage substance description. The machine learning system enables recognition and/or identification of tens, hundreds, thousands, or millions of features and/or feature values for tens, hundreds, thousands, or millions of observations, thereby increasing accuracy and consistency and reducing delay associated with substance description management relative to requiring computing resources to be allocated for tens, hundreds, or thousands of operators to manually manage substance description using the features or feature values.

As indicated above, FIG. 2 is provided as an example. Other examples may differ from what is described in connection with FIG. 2.

Figure 3:
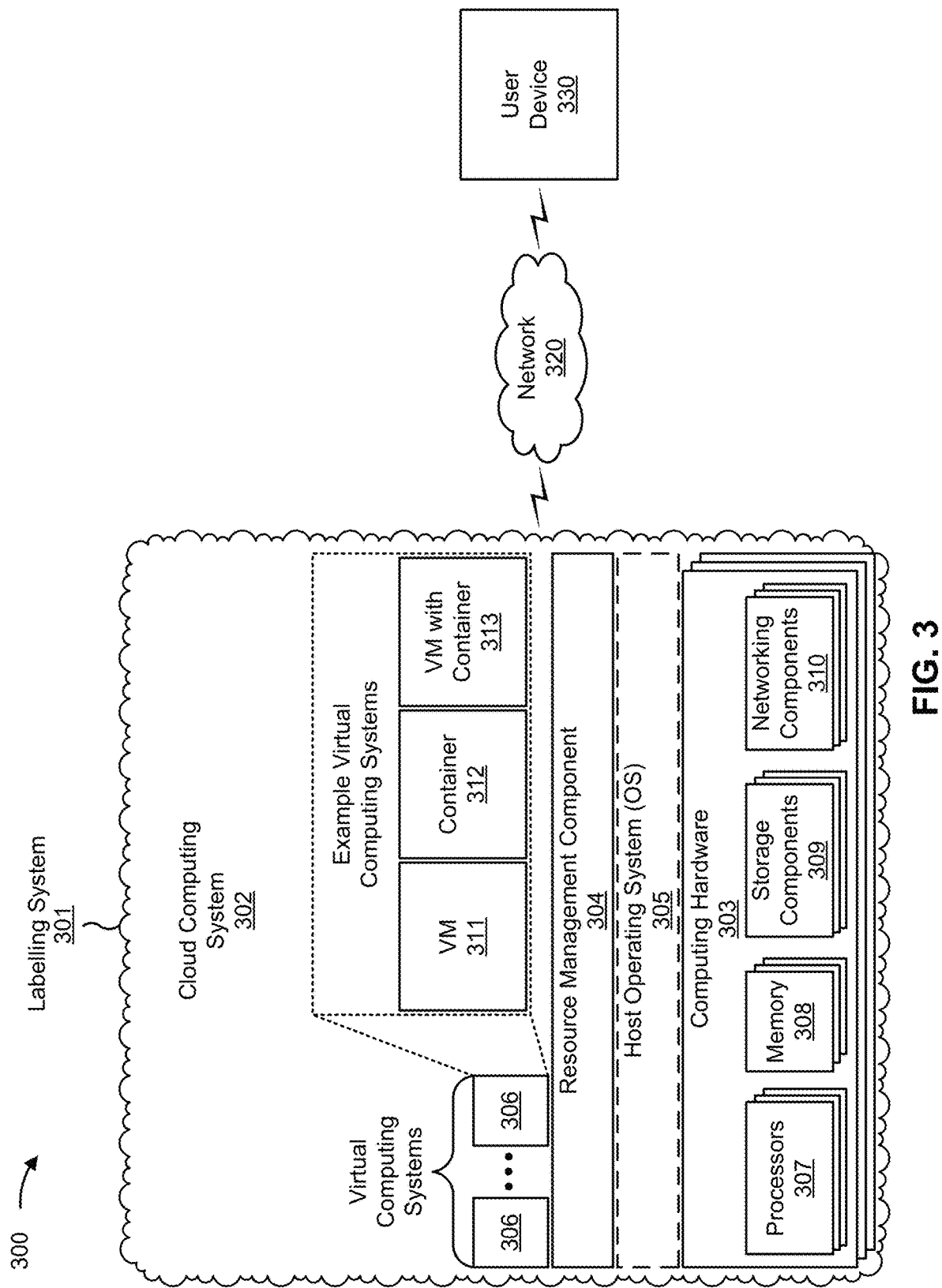
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a labelling system 301, which may include one or more elements of and/or may execute within a cloud computing system 302. The cloud computing system 302 may include one or more elements 303-313, as described in more detail below. As further shown in FIG. 3, environment 300 may include a network 320, and a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the labelling system 301 may include one or more elements 303-313 of the cloud computing system 302, may execute within the cloud computing system 302, and/or may be hosted within the cloud computing system 302, in some implementations, the labelling system 301 may not be cloud-based (e.g., may be implemented outside of a cloud computing system) or may be partially cloud-based. For example, the labelling system 301 may include one or more devices that are not part of the cloud computing system 302, such as device 400 of FIG. 4, which may include a stand-alone server or another type of computing device. The labelling system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 330 includes one or more devices capable of receiving, generating, storing, processing, and/or providing information associated with substance description management, as described elsewhere herein. The user device 330 may include a communication device and/or a computing device. For example, the user device 330 may include a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
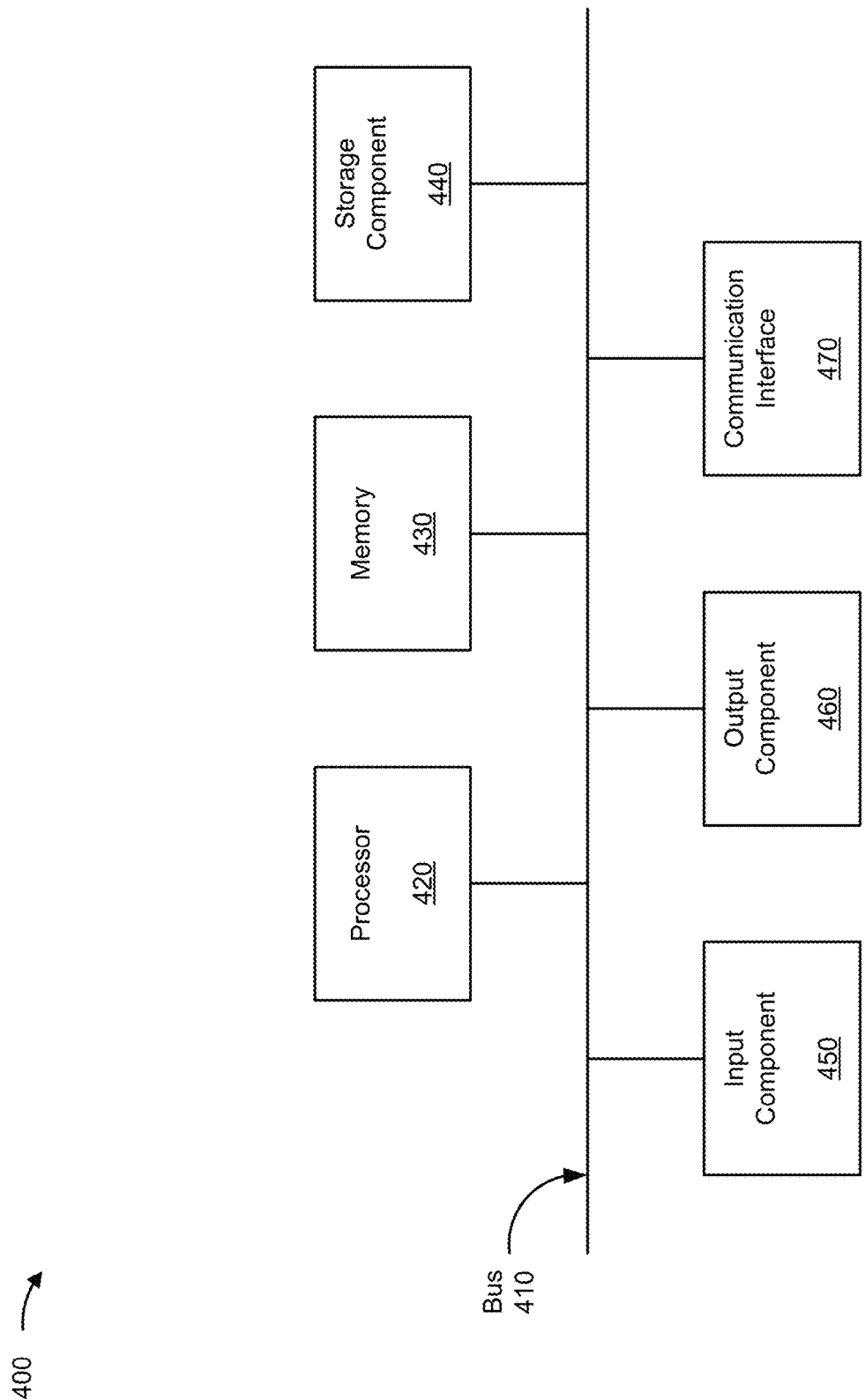
FIG. 4 is a diagram of example components of a device of FIG. 3.

FIG. 4 is a diagram of example components of a device 400 of FIG. 3. Device 400 may correspond to labelling system 301 and/or user device 330. In some implementations, labelling system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
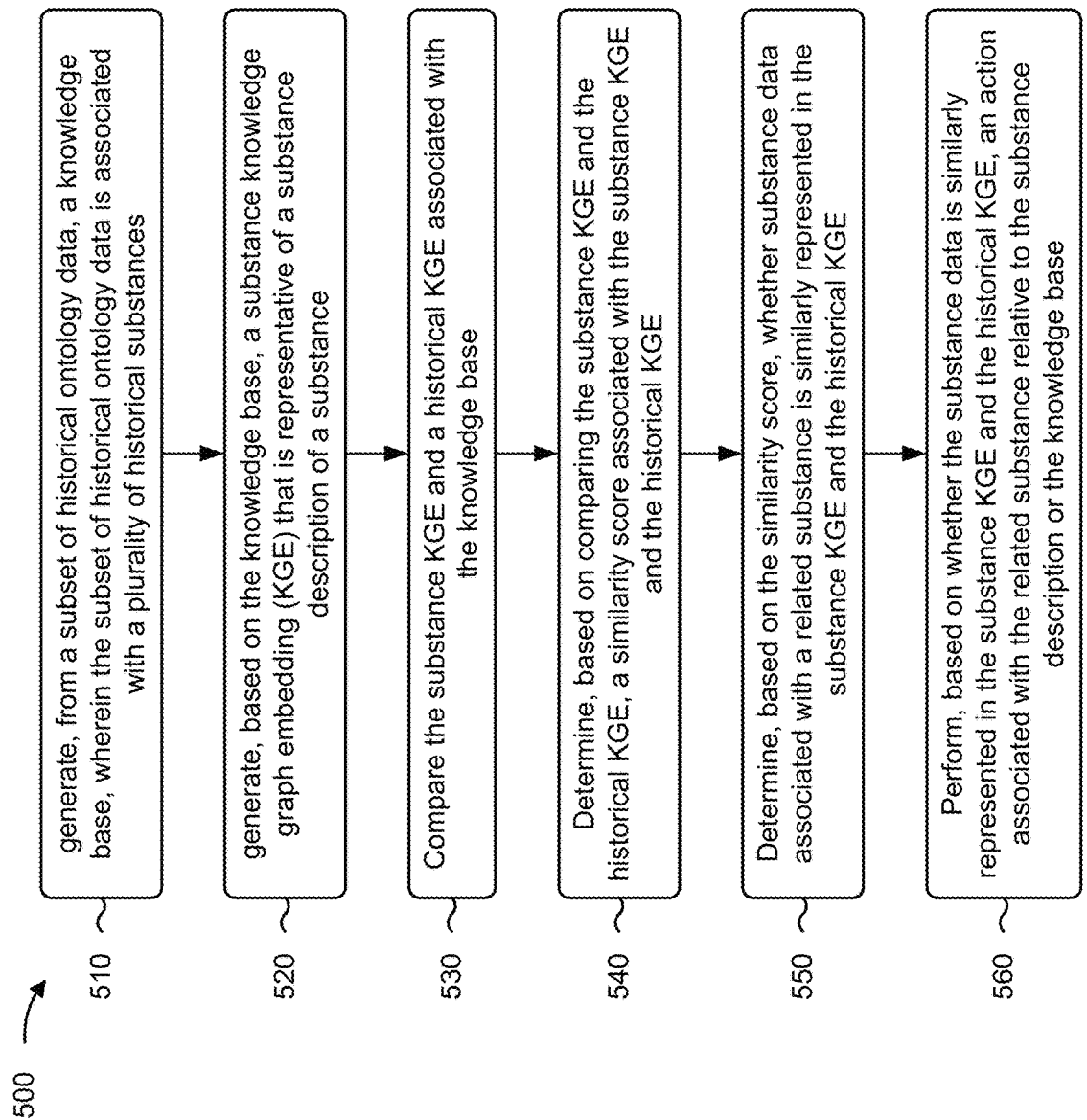
FIG. 5 is a flow chart of an example process associated with substance description management.

FIG. 5 is a flow chart of an example process 500 associated with substance description management. In some implementations, one or more process blocks of FIG. 5 may be performed by a device (e.g., labelling system 301). In some implementations, one or more process blocks of FIG. 5 may be performed by another device or a group of devices separate from or including the device, such as a user device (e.g., user device 330), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include generating, based on related substance information that is associated with a substance, a substance knowledge graph embedding (KGE) that is representative of a substance description of the substance (block 510). For example, the device may generate, based on related substance information that is associated with a substance, a substance knowledge graph embedding (KGE) that is representative of a substance description of the substance, as described above.

As further shown in FIG. 5, process 500 may include generating, from a subset of historical ontology data, a knowledge base, wherein the subset of historical ontology data is selected based on the related substance information (block 520). For example, the device may generate, from a subset of historical ontology data, a knowledge base, as described above. In some implementations, the subset of historical ontology data is selected based on the related substance information.

As further shown in FIG. 5, process 500 may include comparing the substance KGE and a historical KGE associated with the knowledge base (block 530). For example, the device may compare the substance KGE and a historical KGE associated with the knowledge base, as described above.

As further shown in FIG. 5, process 500 may include determining, based on comparing the substance KGE and the historical KGE, a similarity score associated with the substance KGE and the historical KGE (block 540). For example, the device may determine, based on comparing the substance KGE and the historical KGE, a similarity score associated with the substance KGE and the historical KGE, as described above.

As further shown in FIG. 5, process 500 may include determining, based on the similarity score, whether substance data associated with a related substance is similarly represented in the substance KGE and the historical KGE (block 550). For example, the device may determine, based on the similarity score, whether substance data associated with a related substance is similarly represented in the substance KGE and the historical KGE, as described above.

As further shown in FIG. 5, process 500 may include performing, based on whether the substance data is similarly represented in the substance KGE and the historical KGE, an action associated with the related substance relative to the substance description or the knowledge base (block 560). For example, the device may perform, based on whether the substance data is similarly represented in the substance KGE and the historical KGE, an action associated with the related substance relative to the substance description or the knowledge base, as described above.

Process 500 may include additional implementations, such as any single implementation or any combination of implementations described below and/or in connection with one or more other processes described elsewhere herein.

In a first implementation, process 500 includes determining an initial similarity score associated with related substances that are identified in the related substance information and historical related substances that are identified in the historical ontology data; and selecting the subset of historical ontology data based on the initial similarity score.

In a second implementation, alone or in combination with the first implementation, process 500 includes obtaining, from a user input, validation information associated with the substance data being represented in the substance KGE, wherein the action is being performed based on the validation information and on whether the substance data is similarly represented in the substance KGE and the historical KGE.

In a third implementation, alone or in combination with one or more of the first and second implementations, process 500 includes determining, based on the validation information and the similarity score, that substance data associated with the related substance is missing from the knowledge base; and updating the knowledge base to include the substance data.

In a fourth implementation, alone or in combination with one or more of the first through third implementations, process 500 includes determining, based on the validation information and the similarity score, that the substance description does not identify information associated with the related substance; and causing, based on determining that the substance description does not identify the related substance, the substance description to identify a relationship of the related substance.

In a fifth implementation, alone or in combination with one or more of the first through fourth implementations, process 500 includes determining, based on a convergence condition associated with the substance KGE and the historical KGE, that the substance data is similarly represented in the substance KGE and the historical KGE; and updating, based on determining that the substance data is similarly represented in the substance KGE and the historical KGE, the knowledge base to include the substance data or the substance description based on the substance data.

In a sixth implementation, alone or in combination with one or more of the first through fifth implementations, process 500 includes reading, based on a format of the substance description, text from the substance description that is associated with the related substance information; and identifying, using a neural network, the pluralities of related substances and relationships between the pluralities of related substances, wherein the substance KGE is generated based on the pluralities of related substances and relationships between the pluralities of related substances. In a seventh implementation, alone or in combination with one or more of the first through sixth implementations, process 500 includes, prior to comparing the substance KGE and the historical KGE, identifying the pluralities of related substances in the related substance information; selecting, based on the historical ontology data being associated with the pluralities of related substances, the historical ontology data from the knowledge base; and generating the historical KGE based on the historical ontology data being selected.

In a seventh implementation, alone or in combination with one or more of the first through sixth implementations, process 500 includes the validation information being obtained based on the similarity score not satisfying a threshold associated with the substance KGE and the historical KGE being similar. In an eighth implementation, alone or in combination with one or more of the first through seventh implementations, process 500 includes the validation information being received via a user input that is associated with a request to a user to validate the representation of the related substance within the substance description.

In an ninth implementation, alone or in combination with one or more of the first through eighth implementations, process 500 includes determining, based on the validation information and the similarity score, that substance data associated with the related substance is missing from the knowledge base; and updating the knowledge base to include the substance data.

In a tenth implementation, alone or in combination with one or more of the first through ninth implementations, process 500 includes determining, based on the validation information and the similarity score, that the substance description does not identify information associated with the related substance; and causing, based on determining that the substance description does not identify the related substance, the substance description to identify a relationship of the related substance.

In an eleventh implementation, alone or in combination with one or more of the first through tenth implementations, process 500 includes the similarity score comprising a coherence similarity score that is generated based on a cosine similarity analysis. In a twelfth implementation, alone or in combination with one or more of the first through eleventh implementations, process 500 includes, when determining the similarity score, generating a substance coherency cluster associated with the substance KGE and a historical coherency cluster associated with the historical KGE; and determine the similarity score based on an alignment analysis of the substance coherency cluster and the historical coherency cluster, wherein the substance data is determined to be misaligned based on the alignment analysis.

In a thirteenth implementation, alone or in combination with one or more of the first through twelfth implementations, process 500 includes, when determining that the substance data is misaligned, detecting that the substance data is outside of the historical coherency cluster, and wherein, performing the action, includes determining, based on detecting that the substance data is outside of the historical coherency cluster, that a relationship of the related substance is to be included in the knowledge base; and updating the knowledge base to include the substance data.

In a fourteenth implementation, alone or in combination with one or more of the first through thirteenth implementations, process 500 includes, when determining that the substance data is misaligned, detect that the substance data is outside the substance coherency cluster and inside the historical coherency cluster, and wherein, performing the action, includes determining that a relationship of the related substance, that is associated with the substance data, is to be included in the substance description; and updating the substance KGE to include the substance data.

In a fifteenth implementation, alone or in combination with one or more of the first through fourteenth implementations, process 500 includes, when performing the action, includes generating, based on updating the knowledge base, a new historical KGE; determine, based on a new similarity score associated with the new substance KGE and the historical KGE, that the convergence condition is satisfied; and based on determining that the convergence condition is satisfied, at least one of: cause the substance description to be updated according to the new substance KGE, or update a knowledge graph based on updating the knowledge base.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a substance description of a substance,
wherein the substance description includes at least one of information associated with a label related to the substance or information associated with a document including the information associated with the label;
processing, by the device, the substance description to identify a layout of the substance description to facilitate identification of text associated with the substance description;
identifying, by the device and based on identifying the text from the substance description, related substance information associated with a plurality of related substances that are associated with the substance;
generating, by the device and based on the related substance information, a substance knowledge graph embedding (KGE) that is associated with the substance;
comparing, by the device, the substance KGE and a historical KGE associated with historical ontology data,
wherein the historical ontology data includes historical substance information that is associated with the plurality of related substances;
determining, by the device and based on comparing the substance KGE and the historical KGE, a similarity score associated with a related substance of the plurality of related substances,
wherein the similarity score is representative of the related substance being similarly represented within the substance KGE and the historical KGE;
obtaining, by the device and based on the similarity score, validation information associated with a representation of the related substance within the substance KGE,
wherein the validation information indicates a degree of confidence associated with the representation of the related substance within the substance KGE; and
performing, by the device and based on the validation information, an action associated with the substance description or a knowledge base that is associated with the historical ontology data.

2. The method of claim 1, wherein identifying the related substance information comprises:
reading, based on a format of the substance description, text from the substance description that is associated with the related substance information; and
identifying, using a neural network, the plurality of related substances and relationships between the plurality of related substances,
wherein the substance KGE is generated based on the plurality of related substances and relationships between the plurality of related substances.

3. The method of claim 1, further comprising, prior to comparing the substance KGE and the historical KGE:
identifying the plurality of related substances in the related substance information;
selecting, based on the historical ontology data being associated with the plurality of related substances, the historical ontology data from the knowledge base; and
generating the historical KGE based on the historical ontology data being selected.

4. The method of claim 1, wherein the validation information is obtained based on the similarity score not satisfying a threshold associated with the substance KGE and the historical KGE being similar.

5. The method of claim 1, wherein the validation information is received via a user input that is associated with a request to a user to validate the representation of the related substance within the substance description.

6. The method of claim 1, wherein performing the action comprises:
determining, based on the validation information and the similarity score, that substance data associated with the related substance is missing from the knowledge base; and
updating the knowledge base to include the substance data.

7. The method of claim 1, wherein performing the action comprises:
determining, based on the validation information and the similarity score, that the substance description does not identify information associated with the related substance; and
causing, based on determining that the substance description does not identify the related substance, the substance description to identify a relationship of the related substance.

8. A device, comprising:
one or more memories; and
one or more processors, communicatively coupled to the one or more memories, configured to:
receive a substance description that is associated with a substance,
wherein the substance description includes at least one of information associated with a label related to the substance or information associated with a document including the information associated with the label;
process the substance description to identify a layout of the substance description to facilitate identification of text associated with the substance description;
select, based on identifying the text from the substance description, a subset of historical ontology data that is associated with a plurality of historical substances;
generate, from the subset of historical ontology data and the substance description, a knowledge base;
generate, based on the knowledge base, a substance knowledge graph embedding (KGE) that is representative of the substance;
compare the substance KGE and a historical KGE associated with the knowledge base;
determine, based on comparing the substance KGE and the historical KGE, a similarity score associated with the substance KGE and the historical KGE;
determine, based on the similarity score not satisfying a threshold, an updated prediction score representative of substance data associated with a related substance is misaligned between the substance KGE and the historical KGE; and
based on the updated prediction score, select a revised subset of the historical ontology data.

9. The device of claim 8, wherein the subset of historical ontology data is selected based on an initial prediction score.

10. The device of claim 8, wherein the one or more processors, when determining the similarity score, are configured to:
generate a substance coherency cluster associated with the substance KGE and a historical coherency cluster associated with the historical KGE; and
determine the similarity score based on an alignment analysis of the substance coherency cluster and the historical coherency cluster,
wherein the substance data is determined to be misaligned based on the alignment analysis.

11. The device of claim 10, wherein the one or more processors, when determining that the substance data is misaligned, are configured to:
detect that the substance data is outside of the historical coherency cluster, and
wherein the one or more processors, when performing an action, are configured to:
determine, based on detecting that the substance data is outside of the historical coherency cluster, that a relationship of the related substance is to be included in the knowledge base; and
update the knowledge base to include the substance data.

12. The device of claim 10, wherein the one or more processors are configured to:
receive an electronic document, and
extract the substance description from the electronic document.

13. The device of claim 8, wherein the one or more processors are configured to:
determine interaction data and relationship data from the substance description using a neural network model,
display the interaction data and the relationship data to a user,
receive feedback data from the user, and
modify the neural network model based on the feedback data.

14. A non-transitory computer-readable medium storing instructions, the instructions comprising:
one or more instructions that, when executed by one or more processors, cause the one or more processors to:
receive a substance description that includes at least one of information associated with a label related to the substance or information associated with a document including the information associated with the label;
process the substance description to identify a layout of the substance description to facilitate identification of text associated with the substance description;
select, based on identifying the text from the substance description, a subset of historical ontology data;
generate, from the subset of historical ontology data and the substance description, a knowledge base,
wherein the subset of historical ontology data is associated with a plurality of historical substances;
generate, based on the knowledge base, a substance knowledge graph embedding (KGE) that is representative of the substance;
compare the substance KGE and a historical KGE associated with the knowledge base;
determine, based on comparing the substance KGE and the historical KGE, a similarity score associated with the substance KGE and the historical KGE;
determine, based on the similarity score, whether substance data associated with a related substance is similarly represented in the substance KGE and the historical KGE; and
perform, based on whether the substance data is similarly represented in the substance KGE and the historical KGE, an action associated with the related substance relative to the substance description or the knowledge base.

15. The non-transitory computer-readable medium of claim 14, wherein prior to causing the one or more processors to generate the knowledge base, the one or more instructions, when executed by the one or more processors, cause the one or more processors to:
determine an initial similarity score associated with related substances that are identified in information associated with the related substance and historical substances that are identified in the historical ontology data; and
select the subset of historical ontology data based on the initial similarity score.

16. The non-transitory computer-readable medium of claim 14, wherein the one or more instructions, when executed by the one or more processors, further cause the one or more processors to:
obtain, from a user input, validation information associated with the substance data being represented in the substance KGE,
wherein the action is performed based on the validation information and on whether the substance data is similarly represented in the substance KGE and the historical KGE.

17. The non-transitory computer-readable medium of claim 16, wherein the one or more instructions, that cause the one or more processors to perform the action, cause the one or more processors to:
determine, based on the validation information and the similarity score, that substance data associated with the related substance is missing from the knowledge base; and
update the knowledge base to include the substance data.

18. The non-transitory computer-readable medium of claim 16, wherein the one or more instructions, that cause the one or more processors to perform the action, cause the one or more processors to:
determine, based on the validation information and the similarity score, that the substance description does not identify information associated with the related substance; and
cause, based on determining that the substance description does not identify the related substance, the substance description to identify a relationship of the related substance.

19. The non-transitory computer-readable medium of claim 14, wherein the one or more instructions, that cause the one or more processors to perform the action, cause the one or more processors to:
determine, based on a convergence condition associated with the substance KGE and the historical KGE, that the substance data is similarly represented in the substance KGE and the historical KGE; and
update, based on determining that the substance data is similarly represented in the substance KGE and the historical KGE, the knowledge base to include the substance data or the substance description based on the substance data.

20. The method of claim 1, further comprising:
analyzing the historical ontology data to identify historical substances;
determining, based on analyzing the historical ontology data, relationships between the historical substances; and
generating information associated with the relationships in a form of subject-predicate-object.

* * * * *